July 23, 1929.  A. SCHONEBERGER  1,722,236
GAS METER FITTING
Filed Aug. 18, 1927
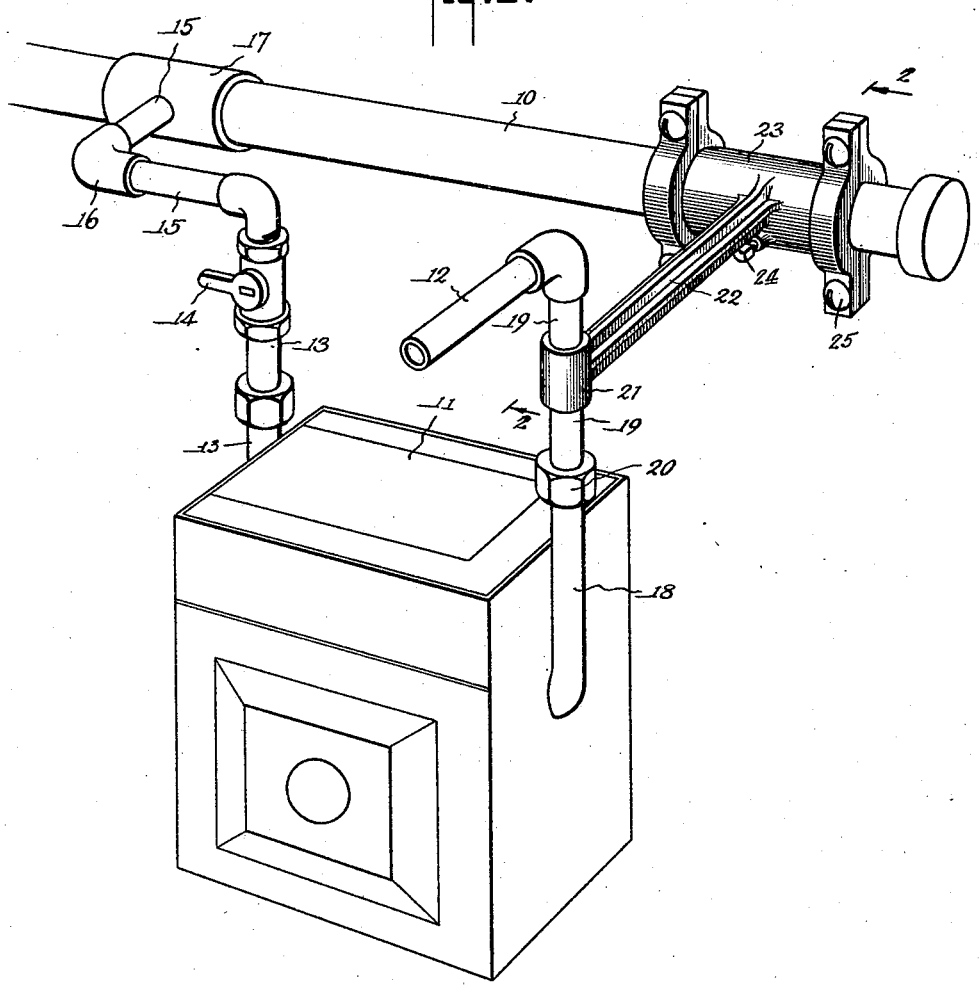
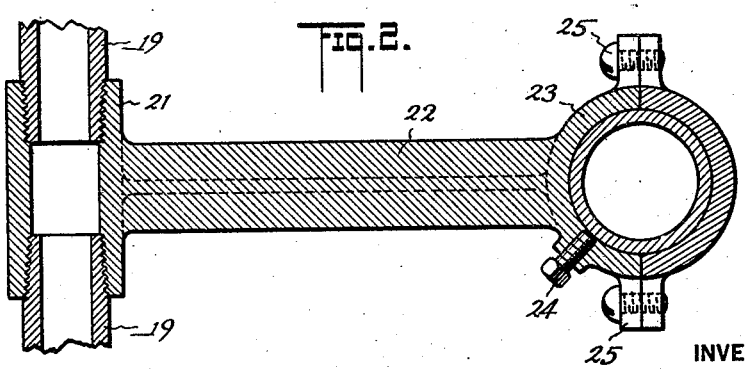
WITNESSES
INVENTOR
Adolph Schoneberger.
BY
ATTORNEY Patented July 23, 1929.

1,722,236

UNITED STATES PATENT OFFICE.

ADOLPH SCHONEBERGER, OF NEW YORK, N. Y., ASSIGNOR TO ALBERT BENFIELD, OF NEW YORK, N. Y.

GAS-METER FITTING.

Application filed August 18, 1927. Serial No. 213,843.

The present invention is concerned with the provision of a fitting for gas meters, primarily designed to prevent leakage at the meter due to the loosening up of joints and connections under vibration.

In accordance with present house meter practice, platforms must be constructed for the meter boxes, and in spite of every precaution, a leak frequently occurs in the meter connections due to vibrations either within the house or vibrations caused by passing traffic. An extremely large percentage of all leaks which the gas companies are called upon to repair, are at the meter box connections, and failure of the pipe system at this point has proven a source of tremendous expense and inconvenience to all gas companies.

In accordance with the present invention, I have designed a fitting intended to overcome the foregoing difficulties by rigidly supporting the meter and its associated connections in such a manner that they are immovable under vibration relatively to the service pipe with which they are commonly associated.

Other objects of the invention are to provide a fitting of simple, practical construction, which will be rugged, durable and efficient in use, and well suited to the requirements of economical manufacture and convenient installation.

With the above noted and other objects in view, the invention consists in certain novel features of construction and combinations and arrangements of parts, as will be more fully hereinafter set forth and pointed out in the claim. The invention may be more fully understood from the following description in connection with the accompanying drawings, wherein—

Fig. 1 is a perspective view showing a gas meter and its associated parts secured against vibration by one of my improved fittings.

Fig. 2 is an enlarged longitudinal sectional view through the fitting on the line 2—2 of Fig. 1.

In the drawings, I have used the reference numeral 10 to designate the house service pipe of a gas line, and the reference numeral 11 to designate the meter through which gas from the service pipe is passed on its way to the house supply line 12.

The service pipe 10 may be rigidly mounted upon a wall or other suitable support, and the meter 11 is supported by the pipe 10 through the intermediacy of the meter fittings.

In the present instance I have shown a pipe 13 conducting gas from the service pipe to the meter. The usual cutoff valve 14 is arranged in the pipe 13, and the pipe 13 rigidly connected to the service pipe through a pair of short horizontal pipes 15 joined to each other by an elbow 16 and to the service pipe by a coupling 17. Pipe 13 which may include any number of pipe sections, is disposed in vertical position at one side of the meter, and is preferably connected thereto in the usual manner (not illustrated). At the opposite side of the meter, and also soldered thereto, is a pipe 18 for delivering gas to the house line 12. The house line 12 is connected to the vertical pipe 18 through a short connecting riser pipe 19 coupled at 20 to the pipe 18.

As thus far described, the construction may be entirely conventional, except that riser 19 is preferably made in two sections instead of the one piece now used; the present invention being concerned with the provision of a fitting which rigidly connects the riser 19 with the service pipe 10. This fitting includes at one end a sleeve portion 21 internally tapered to receive the two sections of the pipe 19. The axis of the sleeve is disposed in vertical position, and the sleeve is rigidly integrally connected by an arm 22 to a sectional clamping member 23 which firmly embraces the pipe 10, and is held against slipping by a set screw 24. One section of the clamping member 23 is integral with the arm 22, and the other section is detachably mounted by clamping screws 25 passing through aligned ears on the two sections.

By virtue of the above arrangement, spreading of the solder joints of the pipes 18 and 13, and consequent leakage of gas is eliminated. The meter box is firmly sustained against vibration by the rigid connection between the riser pipe 19 and the service pipe 10. The fitting 21, 22, 23 may be cheaply manufactured and conveniently applied to any ordinary meter installation. It serves to entirely eliminate the need for building shelves and taking every expensive precaution to prevent failure at the meter box.

Obviously various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claim.

I claim:

As a new article of manufacture, a fitting for lending rigidity to gas meter connections comprising a rigid arm, an internally threaded right angularly disposed sleeve at one end of the arm into which a riser from the meter is adapted to be screwed, and a right angularly disposed sleeve at the other end of the arm adapted to grip a service pipe.

Signed at Brooklyn in the county of Kings and State of New York this 16th day of August, A. D. 1927.

ADOLPH SCHONEBERGER.